F. M. BUTLER.
Chimney Cap.
No. 21,115.
Patented Aug. 10, 1858.
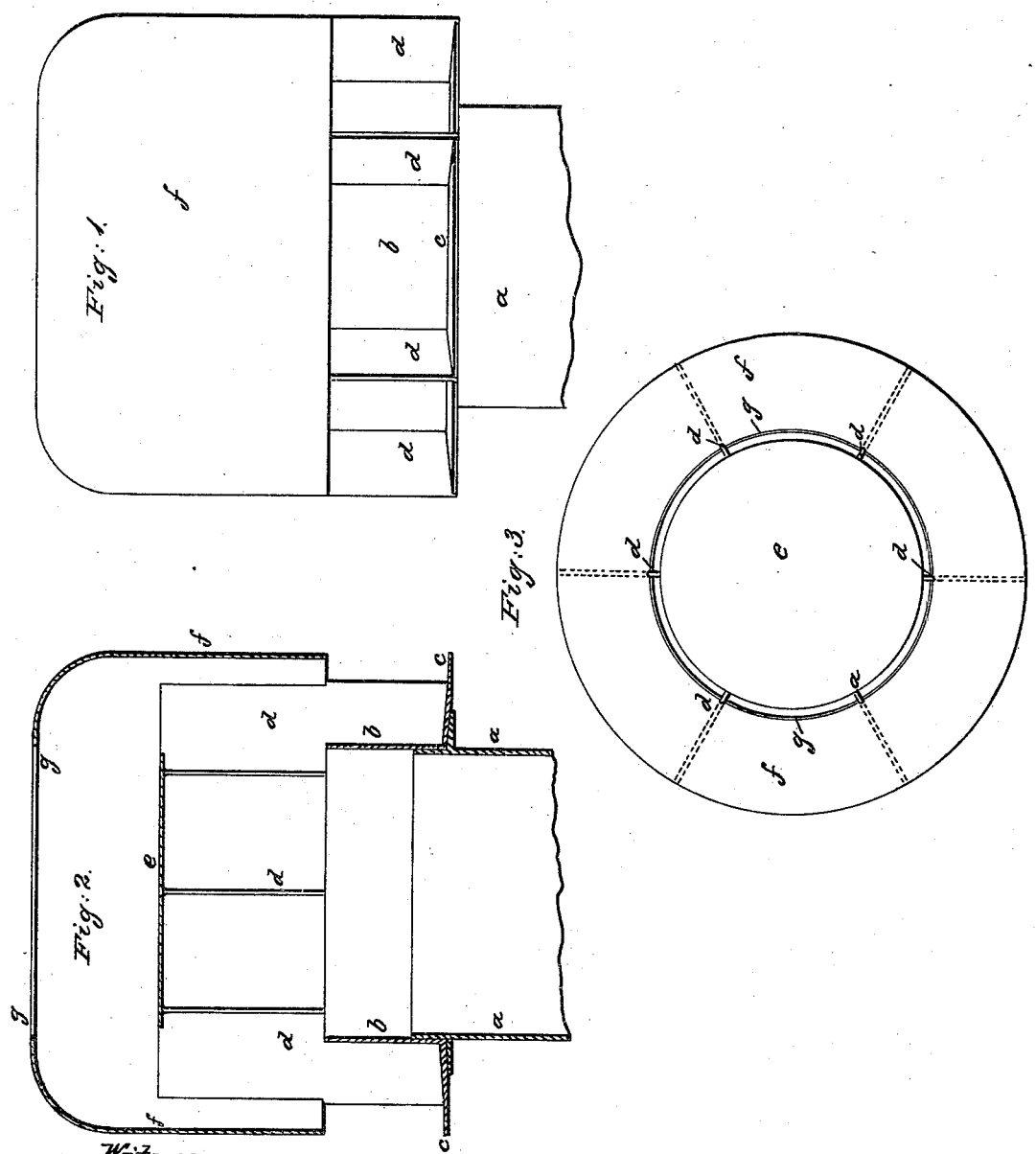
Witnesses:
Lemuel W. Serrell
Thomas G. Harold
Inventor:
Fredk M Butler

UNITED STATES PATENT OFFICE.

F. M. BUTLER, OF NEW YORK, N. Y.

WIND-GUARD FOR CHIMNEYS.

Specification of Letters Patent No. 21,115, dated August 10, 1858.

*To all whom it may concern:*

Be it known that I, FREDERICK M. BUTLER, of the city, county, and State of New York, have invented, made, and applied to use a certain new and useful Improvement in Ventilators or Wind-Guards for Chimneys and other Purposes; and I do hereby declare that the following is a full, clear, and exact description of the same, reference being had to the annexed drawing, making part of this specification, wherein—

Figure 1 is a side view of my ventilator. Fig. 2, is a vertical section and Fig. 3 is a plan.

Similar marks of reference denote corresponding parts.

Various kinds of wind guards and ventilators have heretofore been made, in which vertical plates have been used to surround the upper end of the flue, and a hood has also surrounded the said flue of a conical or other form and inner disks have been used.

My said invention therefore does not relate to the vertical plates in themselves or to a hood or the inner disk, but my said invention consists in the combination of a peculiar hood with radial guards, and an inner disk with or without a flange around the flue to be ventilated, in such a manner that there is always more space for the escape of gases than there is for the ingress of wind or currents of air, no matter in what direction said air may strike the said guard or cap.

In the drawing $a$, is the top of the chimney or flue to be ventilated; $b$, is a pipe of any convenient size or shape adapted to said flue. I however prefer that the same be circular or oval.

$c$, is an annular flange around the pipe $b$, from which the vertical flanges, or radial guards $d$, rise; these radial guards should be at least six in number, and are connected to the pipe $b$, and at their upper ends to the disk $e$, which corresponds in size and shape to the pipe $b$, and is immediately over said opening but sufficiently above the same to leave a space between the upper end of said pipe and the edge of the disk of about twice the area of said pipe.

$f$ is a hood, the lower edge of which is at about the line of the top of the pipe $b$, and the same incloses the radial guards $d$, and rises above the same in the form shown where it terminates with an opening $g$.

The operation is as follows. Any current of air blowing horizontally against any wind guard is directed upward by the radial guards $d$, $d$, escapes through the opening $g$, and on the opposite side of the ventilator; which affords ample space for the escape of said current of air as well as that rising from the pipe $b$, because there are equal to two areas for the escape and only one for admitting the external current of air; such is also the case if the wind blows into the opening $g$, there are equal to two areas for escape around the pipe $b$, and it is impossible for any wind to blow directly into the pipe $b$.

Having thus described the nature and operation of my ventilator or wind guard I do not limit myself to the size or shape of my wind guard whether round or polygonal, although I prefer the former or an oval.

What I claim as my invention and desire to secure by Letters Patent is—

The arrangement of the pipe $b$, radial guards $d$, inner disk $e$, and hood $f$ when in substantially the proportions and for the purposes specified.

In witness where I have hereunto set my signature this eighth day of May, 1858.

FREDK. M. BUTLER.

Witnesses:
 LEMUEL W. SERRELL,
 THOMAS G. HAROLD.